(12) United States Patent
Oh

(10) Patent No.: US 7,261,146 B2
(45) Date of Patent: Aug. 28, 2007

(54) CONDUCTIVE HEAT-EQUALIZING DEVICE

(75) Inventor: Hieyoung W. Oh, Bowdoin, ME (US)

(73) Assignee: Illinois Tool Works Inc, Glenview, IL (US)

( * ) Notice: Subject to any disclaimer, the term of this patent is extended or adjusted under 35 U.S.C. 154(b) by 495 days.

(21) Appl. No.: 10/696,961

(22) Filed: Oct. 30, 2003

(65) Prior Publication Data

US 2004/0188081 A1  Sep. 30, 2004

Related U.S. Application Data

(60) Provisional application No. 60/441,109, filed on Jan. 17, 2003.

(51) Int. Cl.
*F28F 5/02* (2006.01)
*F28F 13/00* (2006.01)

(52) U.S. Cl. .................................................. 165/135

(58) Field of Classification Search ................ 165/135, 165/185
See application file for complete search history.

(56) References Cited

U.S. PATENT DOCUMENTS

| | | | | |
|---|---|---|---|---|
| 3,291,204 A | * | 12/1966 | Norton | 165/89 |
| 3,600,550 A | * | 8/1971 | Katsumata et al. | 219/619 |
| 4,867,235 A | * | 9/1989 | Grapes et al. | 165/185 |
| 5,042,565 A | | 8/1991 | Yuen et al. | 165/41 |
| 5,467,814 A | * | 11/1995 | Hyman et al. | 165/41 |
| 5,611,394 A | * | 3/1997 | Mizuta et al. | 165/89 |
| 6,005,184 A | * | 12/1999 | Barnes | 136/246 |
| 6,339,211 B1 | * | 1/2002 | Foote et al. | 219/216 |
| 6,690,907 B2 | * | 2/2004 | Lee | 399/330 |
| 6,837,306 B2 | * | 1/2005 | Houle et al. | 165/185 |
| 6,853,833 B2 | * | 2/2005 | Cho et al. | 399/330 |
| 6,919,115 B2 | * | 7/2005 | Foster | 428/36.9 |

FOREIGN PATENT DOCUMENTS

| | | |
|---|---|---|
| DE | 19 17 380 B2 | 4/1969 |
| DE | 85 02 397.3 | 1/1985 |
| DE | 197 30 389 C2 | 7/1997 |
| GB | 2 279 734 | 1/1995 |
| GB | 2 388 655 | 11/2003 |

OTHER PUBLICATIONS

Webpage found at:☐☐☐☐http://www.electronics-cooling.com/html/2000_jan_techdata.html☐☐☐☐Copyright dated 2001.*

* cited by examiner

*Primary Examiner*—Allen J. Flanigan
(74) *Attorney, Agent, or Firm*—Mark W. Croll; Paul F. Donovan

(57) ABSTRACT

A heat-equalizing device is provided suitable to transfer heat from hooter areas to colder areas, and is particularly suitable for equalizing surface temperatures along a heated structure. The heat-equalizing device includes graphite fibers embedded in insulating material. The graphite fibers form a contact surface extending over and against the heated surface. The contact surface can be flat or curved as necessary for proper operation on the heated surface.

17 Claims, 2 Drawing Sheets

CONDUCTIVE HEAT-EQUALIZING DEVICE

CROSS-REFERENCE TO RELATED APPLICATIONS

The present application claims the benefits of U.S. Provisional Application Ser. No. 60/441,109 filed on Jan. 17, 2003.

FIELD OF THE INVENTION

The present invention relates generally to heated structures in substantially closed thermal systems, and, more particularly, to heat conductive devices within such structures for providing a high degree of uniformity and heat distribution throughout at least a portion of the structure.

BACKGROUND OF THE INVENTION

Many heated structures require a high degree of uniformity and heat distribution to achieve uniform results and performance of the structure. As heat from the heated structure is taken away, heat distribution becomes transiently non-uniform. Such a transient non-uniformity of temperature across the structure or on a heated surface may result in unacceptable performance of the structure. For example, heat distribution on the surface of a fuser roll in a photocopier can be disturbed as a printing media is passed over a part of a surface of the fuser roll. If printing on one size medium is followed immediately by printing of a different size medium, the second medium will receive non-uniform heat applied thereto from the fuser roll. Since proper fusing of fusible inks is a function of heat, residence time and pressure, if the pressure and residence time are the same but the heat applied varies from one part of the medium to another part of the medium, non-uniform fusing can occur. Under fused inks can cause smearing, offset and other unacceptable conditions.

A simple solution to the non-uniformity of heat distribution is to allow a sufficient time lag between operations for the structure to reheat such that the heat is distributed substantially uniformly on the critical region. However, such delay itself can be unacceptable. In photocopiers and printers, increased speed and performance are highly sought after. Thus, delaying a subsequent copying function for a different size medium following a first size medium can require unacceptable delay in a high-speed office machine. As heat is applied, non-uniformity can remain if all areas are heated equally until a maximum temperature is reached and distributed evenly.

It is known to use heat pipes to achieve improved heat distribution uniformity. However, the heat response time of a heat pipe depends on the outer surface material, and it is often difficult to maintain a very thin outer surface on a heat pipe. The heat pipe requires a liquid or vapor within the heat pipe, and the assembly is somewhat cumbersome to install and expensive to manufacture.

What is needed in the art is an improved construction for a heat-equalizing device to maintain heat equilibrium of a heated structure, and to minimize transient temperature differences within critical areas of the heated structure.

SUMMARY OF THE INVENTION

The present invention solves problems and overcomes drawbacks and deficiencies of prior art heat conductive devices by providing a construction using super conductive graphite fibers and layers of insulating materials. The graphite fibers can be arranged on flat, circular or any three-dimensional shape of a heated structure. The graphite fibers equalize heat distribution between hot areas and cold areas effectively and efficiently to maintain equilibrium on a desired surface.

In one aspect thereof, the present invention provides a heat-equalizing device for use in transferring heat from comparatively hotter areas to comparatively colder areas. The heat-equalizing device has a layer of insulating material with graphite fibers in the layer of insulating material. A contact surface is formed by the graphite fibers and the insulating material. The graphite fibers are sufficiently exposed in the contact surface and are of sufficient length to extend between the hotter and colder areas, for transferring heat along the fibers from the hotter areas to the colder areas.

In another aspect thereof, the present invention provides a heat-transferring device with a layer of graphite fibers, insulating material substantially surrounding the fibers while leaving an exposed surface of fibers, and a carrier holding the layer of insulating material surrounding the fibers.

In still another aspect thereof, the present invention provides a heated structure with a heated body having a heated surface and a heat-equalizing device adjacent the heated body. The heat-equalizing device includes a layer of insulating material, and graphite fibers in the layer of insulating material. A contact surface is formed by the insulating materials and the fibers, with the graphite fibers being sufficiently exposed along the contact surface for transferring heat therethrough. The contact surface is disposed in contact with the heated surface.

An advantage of the present invention is providing a heat conductive device that can be shaped as needed for operation on a variety of geometric configurations requiring an evenly heated surface.

Another advantage of the present invention is providing a heat conductive device that equalizes heat distribution along a heated surface and does so efficiently and rapidly.

Still another advantage of the present invention is providing a heat-conducting device that is comparatively easy to manufacture and remains reliable in performance over an extended period of time.

A further advantage of the present invention is providing a heat conductive device that equalizes heat distribution on a heated surface with static components not prone to failure or malfunction.

A still further advantage of the present invention is providing a heat conductive device that can be used to transfer heat from one area to another remote area, and that can be used to remove undesirable heat buildup in a structure.

Other features and advantages of the invention will become apparent to those skilled in the art upon review of the following detailed description, claims and drawings in which like numerals are used to designate like features.

Figure 1:
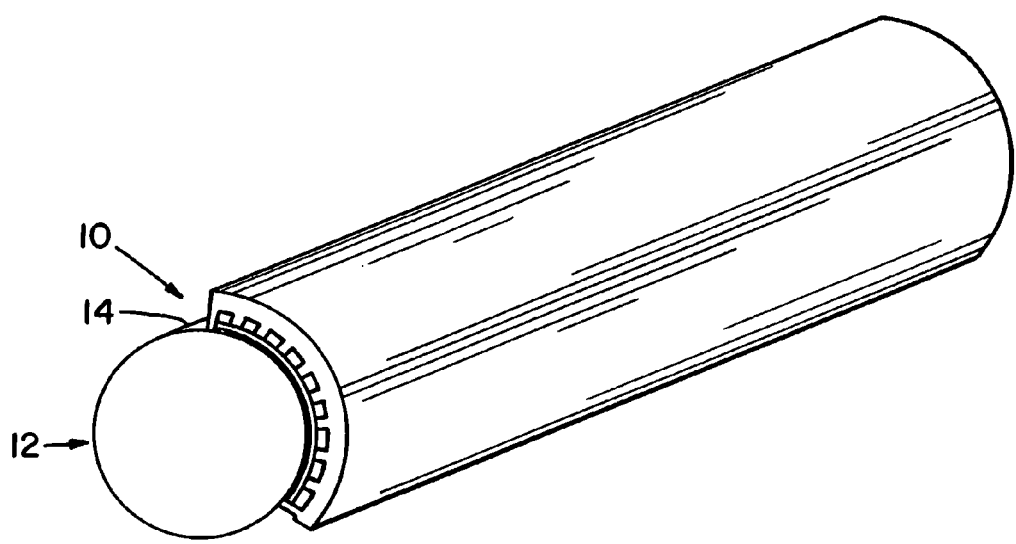
FIG. 1 is an isometric view of a heated structure including a heated roll and a conductive heat-equalizing device in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a super conductive heat-equalizing device in accordance with the present invention. Heat-equalizing device 10 is illustrated installed for operation on a roll 12, which may be a fuser roll in a printer, copier, fax machine or the like or a heated roll in another installations. Roll 12 includes a surface 14 which constitutes an operating surface of roll 12, and which is heated either internally or externally to provide appropriate process treatment. For example, roll 12 as a fuser roll applies heat and pressure together with a pressure roller (not shown) to media passing between roll 12 and the pressure roller (not shown) for fusing toner applied on the media. Those skilled in the art will understand readily that roll 12 as a fuser roll is merely one example of a suitable application for heat-equalizing device 10 according to the present invention. Other types of heated rolls in heated structures can also benefit from the installation of heat-equalizing devices 10 in accordance with the present invention.

Figure 2:
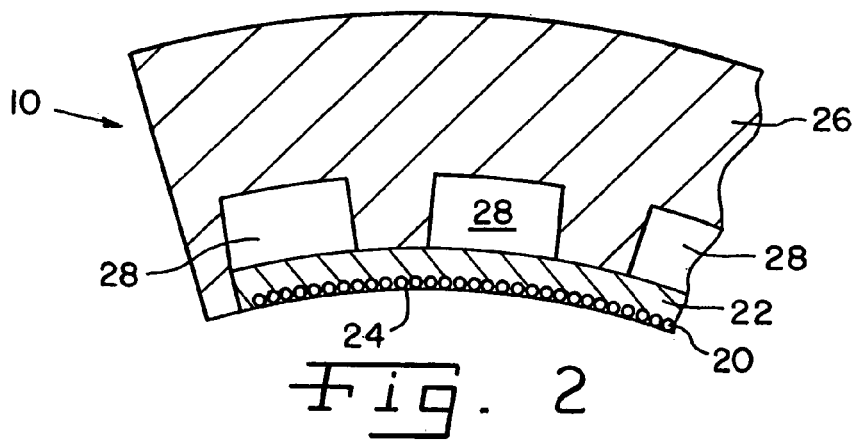
FIG. 2 is a cross sectional view of a portion of the roll and conductive heat-equalizing device shown in FIG. 1.

With reference now to the enlarged cross sectional view shown in FIG. 2, heat-equalizing device 10 includes a layer of elongated graphite fibers 20 extending substantially the length of roll 12. Graphite fibers 20 are embedded in a layer of insulating material 22. Graphite fibers 20 may be attached to insulating material 22 by high temperature adhesive, thermal bonding by melting to the insulating layer, or other appropriate means of attachment. For high temperature application, castable ceramic can be poured over the fibers. Graphite fibers 20 are not completely covered by insulating material 22, and a contact surface 24 of exposed adjacent graphite fibers 20 is provided for disposition in contact with surface 14 of roll 12. Within insulating material 22, graphite fibers 20 can be arranged in substantial parallel alignment in a straight-line fashion, or woven or intertwined with each other. For most efficient heat transfer from a hot spot to a cold spot, straight-line arrangement of graphite fibers 20 is preferred. Individual graphite fibers 20 can be arranged immediately adjacent each other, or individual graphite fibers 20 can be thermally isolated by insulating material 22 between adjacent fibers 20.

The layer of insulating material 22 is formed of ceramic, glass, Teflon, rubber or other highly insulating material. The thickness of the insulating layer is optimized to give the best heat insulation and flexibility of the layer for a gentle application of pressure on graphite fibers 20. Insulating material 22 completely surrounds graphite fibers 20, except for the portions of graphite fiber 20 that are exposed at contact surface 24.

The assembly of graphite fibers 20 and insulating material 22 is held in a carrier body 26, which advantageously is also insulating to further minimize heat loss and improve desired heat transfer by device 10. Alternatively, carrier 26 can be any suitable carrier material for the application such as plastic, metal or the like. A series of air pockets 28 are provided in carrier 26 to further improve the insulating quality of carrier 26. Carrier 26 can be configured with suitable fixtures for securing heat-equalizing device 10 in proper position for operation.

In the use, device 10 is secured adjacent roll 12 such that surface 24 of exposed graphite fibers 20 is in contact with heated surface 14 of roll 12. Graphite fibers 20 are thereby in contact with comparatively hot and comparatively cold regions of surface 14 as roll 12 rotates. As the individual graphite fibers 20 contact both a hotter and a colder region of surface 14, heat is conducted efficiently and rapidly along the length of fibers 20 from the hotter region to the colder region. Surface 14 temperature is quickly and efficiently equalized by the transfer of heat from a hotter spot of surface 14 to a colder spot of surface 14, as roll 12 rotates. Since device 10 extends substantially the working face length of roll 12, the entire surface 14 is equalized in temperature. The colder areas are warmed with heat from the hotter areas. The heat loss from the hotter areas cools the hotter areas so that all areas of surface 14 quickly achieve substantially equal temperature. Thus, if roll 12 is a fuser roll of a copier, when a wider sheet of media follows a narrower sheet of media processed by roll 12, substantially equalized heat is applied to the subsequent wider sheet throughout its width, as a result of the heat-equalization performed by device 10.

Graphite in fiber form tends to be brittle, and impact on graphite fibers 20 should be minimized to reduce breakage. By embedding fibers 20 in insulating material 22, the potential for fibers to break from the surface as a result of friction against the heated surface 14 of roller 12 is minimized. To further protect fibers 20, a surface coating can be provided along contact surface 24, to eliminate direct contact of fibers 20 against surface 14. A thin layer of insulating material similar to insulating material 22 can be laminated along surface 24 to provide physical protection for graphite fibers 20, without substantially reducing heat transfer to and from fibers 20. Any such coating along contact surface 24 is sufficiently thin or of heat conductive material such that graphite fibers 20 remain sufficiently exposed for efficient heat transfer to and from fibers 20 along contact surface 24.

It is known in the operation of some process rolls, such as fuser rolls in copiers, that surface 14 can become irregularly worn from prolonged use. As a result of abrasion from media passing over surface 14, a stair-stepping effect can be created in surface 14, with the different levels corresponding to the edges of the different widths of media processed thereby. An additional advantage from the use of device 10 against surface 14 is that friction from device 10 against surface 14 as roll 12 rotates tends to smooth surface 14 and reduce or eliminate the stair-stepping effect. Further, device 10 provides an insulating cover for roll 12, substantially reducing heat loss to ambient regions, and reducing heating requirements to maintain the desired process temperature on surface 14.

Figure 3:
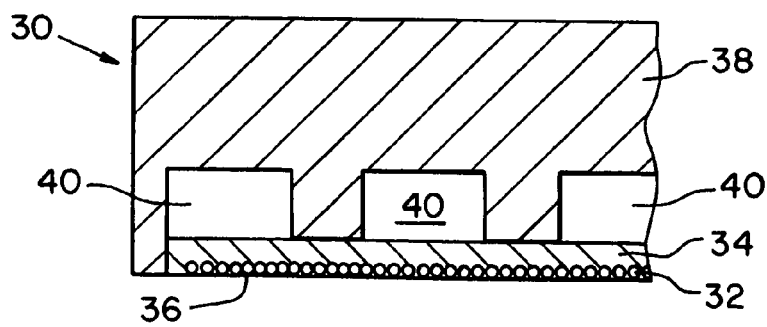
FIG. 3 is a cross sectional view similar to that of FIG. 2, but illustrating a conductive heat-equalizing device in accordance with the present invention for use on a flat heated body.

FIG. 3 illustrates a second embodiment of the present invention. Heat-equalizing device 30 is similar to device 10 shown in FIGS. 1 and 2; however, device 30 is used in flat applications. Unlike the curved shape of device 10, shown in FIGS. 1 and 2, device 30 is substantially rectangular, with a layer of graphite fibers 32 embedded in insulating material 34. Again, an exposed contact surface 36 is provided, which can be protect by a laminated layer of material similar to insulating material 34, or of another material composition. Contact surface 36 is shaped and arranged for disposition against the surface on which device 30 operates. The assembly of graphite fibers 32 embedded in insulating material 34 is retained in a carrier 38, which may include insulating air pockets 40.

Device 30 is used with surface 36 placed against a substantially flat surface (not shown) for which it is desirably to have a substantially uniform heat distribution. Graphite fibers 32 transfer heat from comparatively hotter areas to comparatively cooler areas in a manner similar to that described for heat-equalizing device 10.

Figure 4:
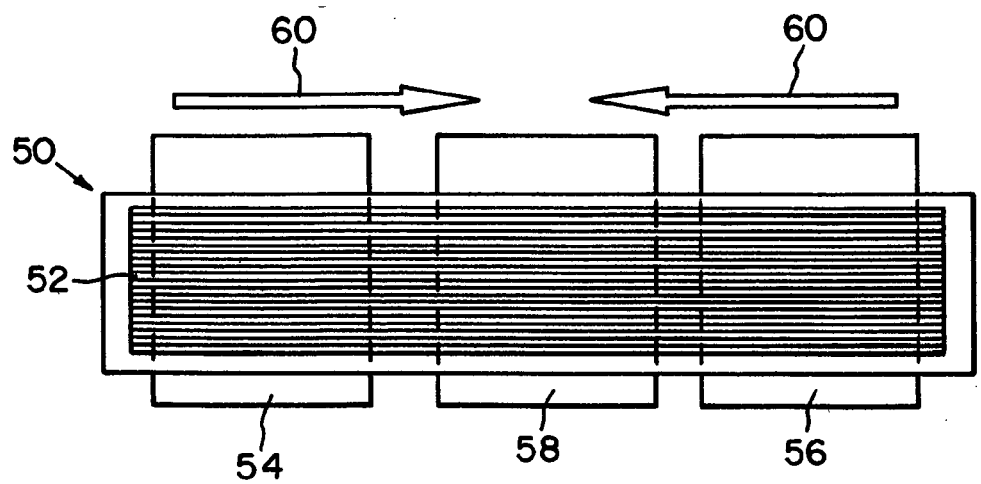
FIG. 4 is a plan view illustrate heat transfer by a conductive heat-equalizing device in accordance with the present invention.

As a result of embedding graphite fibers 20, 32, in insulating material 22, 34, heat transfer tends to be axially oriented along each fiber 20, 32. FIG. 4 schematically illustrates heat transfer in a heat-equalizing device 50 of the present invention having graphite fibers 52 extending between hotter areas 54 and 56 and a colder area 58. The schematic illustration of FIG. 4 shows by arrows 60 the direction of heat transfer, from hotter areas 54, 56 to colder area 58. The schematic representation in FIG. 4 illustrates heat transfer in devices 10 and 30, as well as other heat-equalizing devices of the present invention. Colder area 58 can be heated by hotter areas 54, 56 located near to colder area 58.

Figure 5:
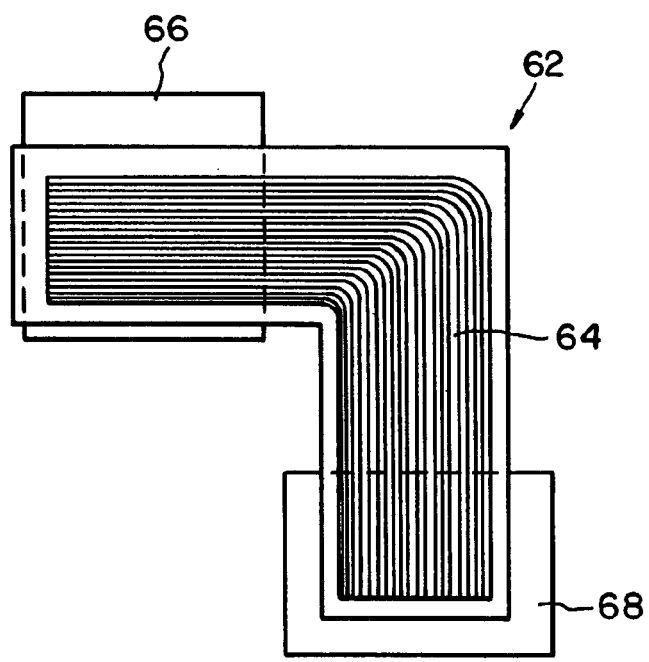
FIG. 5 illustrates fiber orientation for a three-dimensional heat-equalizing device in accordance with the present invention that can be used for directional transfer of heat by the device.

With heat transfer occurring substantially along the lengths of the graphite fibers from a hotter area to a colder area, a device according to the present invention can be used to transfer heat three-dimensionally from a hotter area to a colder area. FIG. 5 illustrates the manner in which a heat-equalizing device 62 of the present invention can be used to perform such three-dimensional heat transfer. Graphite fibers 64 are arranged angularly between a hotter area 66 and a colder area 68. Essentially, graphite fibers 64 are bent or curved between one end thereof and the other end thereof, albeit gently to avoid breaking. Fibers 64 are fixed in shape and position by embedding in suitable insulating material. In this way, heat can be moved in any direction three-dimensionally, from one area that is hotter to another area that is colder.

While shown and described thus far herein for equalizing heat along a heated surface, it should be readily recognized that a device according to the present invention also can be used to remove unwanted heat from an area or device. Thus, devices according to the present invention can be used to cool a heat-generating device by transferring heat from such a device to a heat sink or other device for the purpose of reducing the heat in the heat-generating device. Therefore, in addition to minimizing the impact from the creation of unwanted colder areas, the present invention also can be used to prevent overheating of a device or area in a heat generating structure. The device can be formed in any desired geometric configuration, as required by the specific architecture of the device in which it is installed.

In applications of the present invention against moving surfaces, such as device 10 operating against rotating roll 12, static electric charges can be accumulated from friction between device 10 and roll 12. Any static charges generated can be dissipated to a grounding circuit electrically connected to at least some graphite fibers 20.

To further enhance heating, a heating element or elements can be provided in the layers of insulating material 22, 34. As yet another alternative, heating elements also can be provided in carriers 26, 38. Mounting structures for any of the devices 10, 30, 50, 62 can include springs, inflatable bladders or other resilient biasing devices that provide equal, consistent pressure of devices 10, 30, 50, 62 against the surfaces upon which each operates.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention, and will enable others skilled in the art to utilize the invention. The claims are to be construed to include alternative embodiments to the extent permitted by the prior art.

Various features of the invention are set forth in the following claims.

What is claimed is:

1. A heat-equalizing device for use in transferring heat from comparatively hotter areas to comparatively colder areas, said heat-equalizing device comprising:
   a layer of insulating material;
   graphite fibers in said layer of insulating material;
   a contact surface formed by said graphite fibers and said insulating material, with said graphite fibers being sufficiently exposed in said contact surface and being of sufficient length to extend between the hotter and colder areas, said contact surface being adapted for transferring heat along said fibers from the hotter areas to the colder areas as an associated device moves past said contact surface; and
   a carrier for holding said layer of insulating material having air pockets adjacent said layer of insulating material.

2. The heat-equalizing device of claim 1, said contact surface being curved for disposition against a surface of a roll.

3. The heat-equalizing device of claim 1, said contact surface being flat.

4. The heat-equalizing device of claim 1, at least some of said graphite fibers being curved between one end thereof and the other end thereof.

5. The heat-equalizing device of claim 1, said insulating material being one of Teflon, glass, ceramic and rubber.

6. The heat-equalizing device of claim 1, said contact surface being curved for disposition against a surface of a roll.

7. The heat-equalizing device of claim 1, said contact surface being flat.

8. The heat-equalizing device, of claim 1, at least some of said graphite fibers being curved between one end thereof and the other end thereof.

9. The heat-equalizing device of claim 1, said graphite fibers being substantially linear in said insulating material.

10. A heat-equalizing device for use in transferring heat from comparatively hotter areas to comparatively colder areas, said heat-equalizing device comprising:
    a layer of insulating material;
    graphite fibers in said layer of insulating material;
    a contact surface formed by said graphite fibers and said insulating material, with said graphite fibers being sufficiently exposed in said contact surface and being of sufficient length to extend between the hotter and colder areas, for transferring heat along said fibers from the hotter areas to the colder areas; and a carrier for holding said layer of insulating material, said carrier having an air pocket adjacent said layer of insulating material.

11. A heat-transferring device, comprising:

a layer of graphite fibers;

insulating material substantially surrounding said fibers and leaving an exposed surface of fibers;

a carrier holding said layer of insulating material surrounding said fibers; and a grounding circuit electrically connected to at least one of said fibers.

12. The heat-transferring device of claim 11, said exposed surface being curved for disposition against a curved surface of a heated body.

13. The heat-transferring device of claim 11, said exposed surface being flat.

14. The heat-transferring device of claim 11, at least some of said graphite fibers being curved between one end thereof and the other end thereof.

15. The heat-transferring device of claim 11, said insulating material being one of Teflon, glass, ceramic and rubber.

16. The heat-transferring device of claim 11, said fibers being substantially straight in said layer of said insulating material.

17. A heated structure comprising:

a heated body having a heated surface;

a heat-equalizing device adjacent said heated body, said device including:

a layer of insulating material;

graphite fibers in said layer of insulting material;

a contact surface formed by said insulating materials and said fibers, with said graphite fibers being sufficiently exposed along said contact surface for transferring heat therethrough, and said contact surface being disposed in contact with said heated surface; and a surface coating provided along said contact surface adjacent said heated surface of said heated body.

\* \* \* \* \*